June 6, 1950 L. KATCHATOUROFF ET AL 2,510,117

CARRIER WAVE SIGNAL SYSTEM

Filed April 13, 1943 4 Sheets-Sheet 1

INVENTORS
LEON KATCHATOUROFF
MARC A. LALANDE

BY Edward D. Phinney

ATTORNEY

June 6, 1950 L. KATCHATOUROFF ET AL 2,510,117

CARRIER WAVE SIGNAL SYSTEM

Filed April 13, 1943 4 Sheets-Sheet 2

INVENTORS
LEON KATCHATOUROFF
MARC A. LALANDE
BY
Edward D. Phinney
ATTORNEY

June 6, 1950 L. KATCHATOUROFF ET AL 2,510,117

CARRIER WAVE SIGNAL SYSTEM

Filed April 13, 1943 4 Sheets-Sheet 3

INVENTORS
LEON KATCHATOUROFF
MARC A. LALANDE
BY
Edward D. Phinney
ATTORNEY

June 6, 1950 L. KATCHATOUROFF ET AL 2,510,117

CARRIER WAVE SIGNAL SYSTEM

Filed April 13, 1943 4 Sheets-Sheet 4

INVENTORS
LEON KATCHATOUROFF
MARC A. LALANDE
BY
Edward D. Phinney
ATTORNEY

Patented June 6, 1950 2,510,117

UNITED STATES PATENT OFFICE 2,510,117

CARRIER WAVE SIGNAL SYSTEM

Leon Katchatouroff and Marc A. Lalande, Paris, France, assignors to International Standard Electric Corporation, New York, N. Y., a corporation of Delaware Application April 13, 1943, Serial No. 482,905
In France April 11, 1941

Section 1, Public Law 690, August 8, 1946
Patent expires April 11, 1961

4 Claims. (Cl. 179—2.5)

The invention herein disclosed relates to carrier current transmission systems and particularly to signaling circuits for such systems all as applied to telephone communication systems.

One object of this invention is to provide signaling systems over which carrier current circuits are established in central battery manually or automatically operated junction lines or subscriber lines, which systems will provide the same reliability of operation as the direct current signaling means used in conventional telephone networks.

Another object of the invention is to provide signaling systems over carrier current circuits in local battery junction or subscriber lines.

A further object of the invention is to provide signaling systems over carrier current automatic telegraph circuits.

According to one characteristic of this invention the carrier frequency current in carrier current telephone or telegraph systems is transmitted for each channel in the conversation circuit when a subscriber or operator makes a call.

According to another feature of the invention the ringing impulses in the case of automatic telephone networks are transmitted by interruption of the carrier current which is then retained on the established junction line in order to insure maintenance of this junction line during communication. On termination of the conversation, release of the circuits is insured by suppression of the carrier current on the junction line. Since the carrier current is transmitted during the conversation period it may also be utilized for the transmission of the conversation.

According to another feature of the invention the level or amplitude of the carrier current during ringing and during conversation is kept at a relatively low value in order to prevent overload of the line amplifiers.

Although this invention may find application either in telephone or telegraph systems it will be explained in connection with examples of application to one of the transmission channels of a carrier current multiplex telephone system as fully illustrated in the attached drawings.

Other and more detailed objects of the invention will be apparent from the following description of the embodiments herein disclosed.

This invention resides substantially in the combination, construction, arrangement and relative location of parts as will be described in detail below.

In the accompanying drawings.

Figure 1:
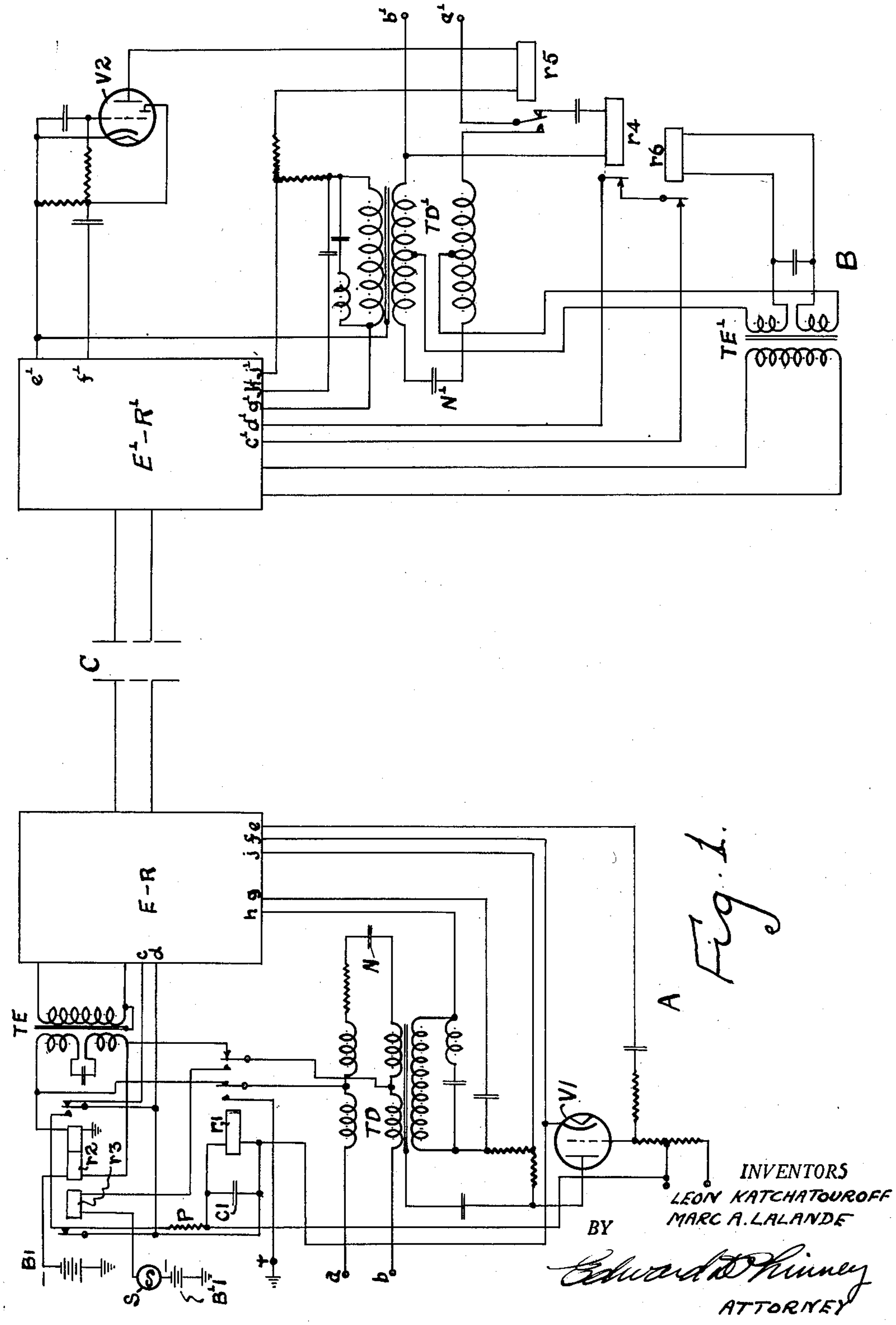
Figure 1 is a schematic illustration of one application of the subject matter of this invention as applied to a subscriber's line in an automatic network.

With reference to Figure 1, the left hand portion A of the illustration shows the equipment provided at the subscriber's station and the right hand portion B illustrates equipment provided at the central exchange. The local subscriber's circuit includes the wires *a*, *b*, coupled to the transmission circuit E and the receiving circuit R indicated by the rectangle E—R. These circuits may be of any suitable type of construction and have not therefore been shown and described in detail in order to keep the illustrative portion as simple as possible. The transmission circuit E′ and the receiving circuit R′ connected to the exchange line *a′*, *b′*, is indicated by the rectangle E′—R′. This apparatus is likewise well known and has not been specifically illustrated. There is included, however, in each of the transmission circuits E and E′ a source of carrier current of any suitable form which is not normally connected to the transmission line C when the system is in a state of rest. The blocking of these currents, that is the disconnection of these sources from the transmission line is effected by connecting the circuit wires *c*, *d* and *c′*, *d′* to normally closed contacts on signaling relays, as will be explained below. A selector and amplifier for the carrier current is included in each of the receiving circuits R and R′. These amplifying circuits are respectively connected to the output wires *e*, *f* and *e′*, *f′*, which apply their output currents to the vacuum tubes V1 and V2. The separate communication currents from these carrier sources are respectively transmitted by the wires *g*, *h* and *g′*, *h′* to the differential transformers TD and TD′ which are connected with their balancing circuits N and N′ to the lines *a*, *b*, and *a′*, *b′* respectively. The transformers TE and TE′ couple the communication transmission circuits E and E′ respectively to the lines *a*, *b* and *a′*, *b′* through the differential transformers TD and TD′. The wires *j* and *j′* serve to feed the plate potentials of the tubes V1 and V2 to the anodes thereof respectively.

The transmission cable C may be of any kind that is suitable to properly conduct a current of a frequency band width of the communication signals to be transmitted in the system.

When the subscriber makes a call by removing the telephone receiver, not shown, he closes the circuit including the wires *a*, *b*, by means of the contacts of the hook switch normally held open when the receiver is not in use. The closing of this circuit closes a circuit for the left hand winding of the relay *r*2 from the negative pole of the grounded battery B1, that is a source of 48 volts potential, through the left hand winding of the relay *r*2, through the outside rest contact of relay *r*1, the circuit *a*, *b* by way of the connecting portions of the differential transformer TD, the inside rest contact of relay *r*1, the right hand winding of relay *r*2 to ground. The two windings of relay *r*2 are additively wound for the purpose of permitting its balancing with respect to earth.

When relay *r*2 is operated it closes its working contact and consequently opens the circuit *c*, *d* at its rest contact, breaking the short circuit that was maintained by the wires *c*, *d* in the transmission circuit E on the source of carrier current. This source can then transmit a carrier current over the transmission line C to the equipment at the exchange end B. This carrier current is transmitted at a low level or amplitude in order not to overload the line amplifiers at any time.

The carrier current after amplification at the receiving end in the circuit R′ is applied by the wires *e*′, *f*′ to the diode portion of the vacuum tube V2 where it is rectified. The rectified output of the diode is employed to polarize the grid of the triode portion to interrupt the plate current thereof which normally keeps the relay *r*5 energized. Upon de-energization of relay *r*5 the exchange circuit wire *a*′ is disconnected from the working contact of the relay and connected to the rest contact thereof to close the exchange loop, including the wires *a*′, *b*′. The closing of this loop actuates relay *r*6 through a portion of the secondary of the differential transformer TD′ as shown, which opens at its resting contact the short circuit that it normally maintains by the wires *c*′, *d*′ on the output side of the carrier current source forming part of the receiving current R′ so that this source is now connected to the transmission equipment E′. This carrier current is then transmitted over the transmission line C to the equipment at the subscriber's station A, where it in turn is amplified and applied to the vacuum tube V1 through wires *f*, *e*. Relay *r*1, however, is not actuated since its winding is shunted by a very low resistance P by means of the working contact of relay *r*2.

When the subscriber operates the dial of his telephone he successively opens the loops *a*, *b*, at the cadence corresponding to the number he is seeking, to cause relay *r*2 to operate at this cadence and by its rest contact periodically short circuits the carrier current source in the transmission circuit E. Thus the transmission of this carrier current over the line C is interrupted at the cadence of dialing.

In the signaling equipment at the automatic exchange end at B relay *r*5 which is controlled by the plate current of the tube V2 operates at the same cadence and opens its contact at each impulse to cause corresponding openings in the loop *a*′, *b*′ in the direction of the automatic apparatus of the exchange. At the first opening of the loop *a*′, *b*′, relay *r*6 falls back and interrupts delivery of the carrier current from the source at the exchange B during the entire portion of the dialing impulses from the exchange A. The relay *r*6 is a retarded relay so as not to operate during the brief intervals between the impulses of the train. However, it again operates between the various trains of impulses. The impulses received by the automatic selecting and switching equipment of the central exchange through line *a*′, *b*′ actuate the automatic switching and connecting mechanism of the exchange in the manner customary in automatic telephony to set up the called circuit.

When the subscriber has finished sending all of the trains of impulses that constitute the called number, relay *r*2 returns to the working position, thus maintaining the carrier current from the source at the exchange A on the line C. Relay *r*5 returns to rest and re-establishes the continuity of the line wires *a*′, *b*′ and thus re-establishes the carrier current from the generator at the exchange B. Conversation may then take place over the telephone circuits in the usual way.

When the subscriber hangs up the receiver at the end of the conversation the circuit *a*, *b*, is opened and relay *r*2 falls back to re-establish the short circuit on the source of carrier current at station A. Relay *r*5 returns to working position and opens the line *a*′, *b*′ at the exchange. As a result of the opening of this line relay *r*6 falls back and interrupts the transmission of carrier current in the exchange B by re-establishing the short circuit around it. The transmission channel is then free for the next call.

When relay *r*2 falls back it also lifts the short-circuit of the relay *r*1. Since at this instant the carrier current that reaches the equipment B is not yet cut off this relay would continue to operate and would send ringing current to the subscriber who has just hung up by closing the subscriber's circuit *a*, *b*, on the source S of low frequency current, for example of 16 cycles per second. A circuit for this is established by the working contacts of relay *r*1 and the winding of relay *r*3. In order to prevent this undesired operation of the subscriber's bell or signal relay *r*1 has its winding shunted by a high capacity C1 which retards operation of relay *r*1 sufficiently to prevent occurrence of this ringing operation before complete release of the circuit *a*, *b*, can take place. Condenser C1 furthermore insures regular operation of relay *r*1 even if for some undesired reason the transmitted carrier current is not regular.

In the case of a call proceeding from the exchange to the subscriber, this call is effected by means of a low frequency current of say 16 cycles per second applied to the circuit *a*′, *b*′, by a suitable source not shown. At the exchange end this current actuates the relay *r*4, the circuit of which is closed by the working contact of relay *r*5, which is normally closed. The carrier current source that forms part of the equipment E′ is normally short circuited through wires *c*′, *d*′ over the rest contacts of relay *r*4 and *r*6 in series. When the low frequency signaling current is sent out relay *r*4 operates and opens its rest contact so that the short circuit is lifted from the source of carrier current in the equipment E′ and the carrier current is then transmitted over the line C to the equipment A for a period equal to the period of application of the low frequency current to relay *r*4.

The emission of carrier current produced in this way actuates the relay *r*1 at the subscriber's end which by means of its working contacts applied the low frequency source S to the terminals of the subscriber's line $a$, $b$ to actuate his signal or bell. In series with the low frequency source S of ringing current is connected a battery $B'1$ of 48 volts pressure for example, the positive pole of which is grounded. The battery $B1$ may also be used to perform the function of the battery $B'1$, if desired.

When the subscriber lifts his receiver it is possible for the system to operate in two ways according to whether he lifts the receiver during a period of transmission of the ringing current or during an interval between successive transmissions thereof, that is between ringing current pulsations. If the subscriber lifts the receiver while the bell is ringing relay $r3$ is traversed by the current of battery $B'1$ that is connected in series with the source of ringing current S. The working contact of relay $r3$ then short-circuits the winding of relay $r1$ and this relay falls back and by means of its rest contacts completes the subscriber's circuit $a$, $b$. The closing of this circuit then causes the operation of relay $r2$ as previously described so that the opening of this rest contact results in the transmission of the carrier current to the equipment at the exchange B. Since the falling back of relay $r1$ results in the release of relay $r3$, the release of the latter relay is retarded so that relay $r1$ may remain short-circuited before relay $r2$ has had time to operate. As soon as relay $r2$ has operated its working contact shunts the winding of relay $r1$ by means of the low value resistance.

The carrier current transmitted to the exchange is amplified in the receiver equipment R' and suppresses the plate voltage of the vacuum tube V2 as previously described. Relay $r5$ then falls back and definitely establishes the exchange loop by means of its rest contact. The conversation circuit is thus established and conversation may take place. Upon termination of the conversation the subscriber hangs up his receiver and the circuit returns to a state of rest as previously described in the case of a call made by the subscriber.

If the subscriber lifts his receiver during an interval between two successive ringing pulsations circuits will be established as previously described in the case of establishing communication from the subscriber's end to the exchange.

Figure 2:
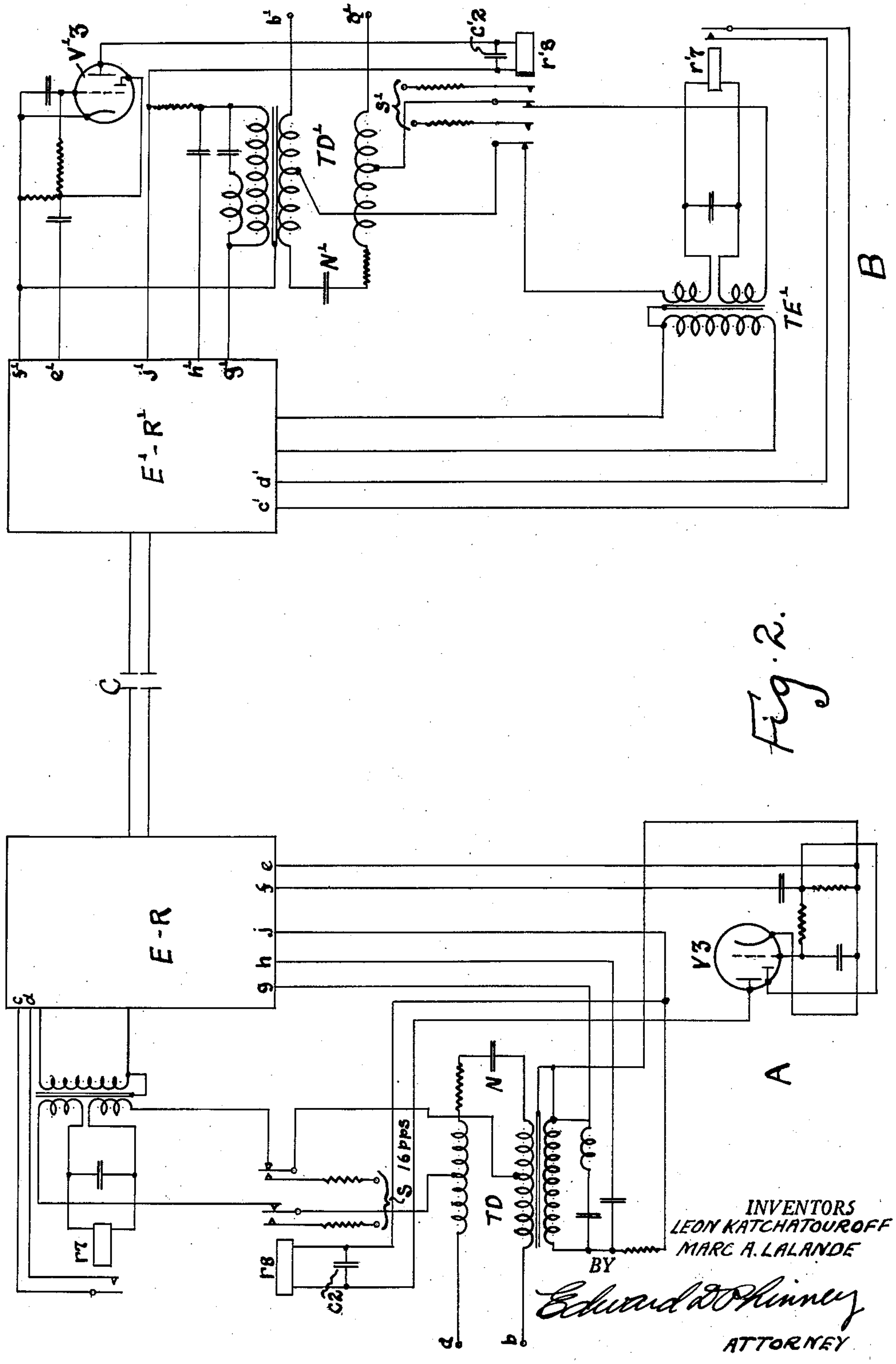
Figure 2 is a schematic illustration of another embodiment of the invention as applied to a subscriber's line in a local battery system in which the carrier current is transmitted continuously for use during communication.

Referring now to Figure 2, there is shown an application of certain features of this invention to a subscriber's line for a local battery system. The equipment comprising the station A is the subscriber's equipment at his end of the line, and the equipment at B comprises the apparatus for his line provided at the other end, similar in this respect to the system of Figure 1. These two stations are connected by the transmission line C as before. The local battery subscriber line $a$, $b$ is connected to the transmission and receiving apparatus represented by the rectangle E, R including an oscillator, all as before, while the local battery exchange line is at $a'$, $b'$ connected to the transmission receiving devices at the exchange E', R'. In this case the signaling devices indicated at A and B are identical, as will appear from an examination of Figure 2. The same reference numerals are used in this figure as were employed in Figure 1 to designate corresponding elements. The wires $c$, $d$ and $c'$, $d'$ are respectively connected in the transmission circuits E and E' to the output of the sources of carrier current that form part of these circuits. However, these wires are not short circuited in the state of rest of this form of the invention since the contacts $r7$ and $r'7$ in which they terminate are open.

The carrier current is transmitted over the line C in both directions when there is no conversation going on. When the subscriber sends into the line $a$, $b$ a low frequency ringing current as, for example, one of 16 periods per second, relay $r7$ operates by means of the rest contacts of relay $r8$ and the subscriber's line $a$, $b$ and its working contact then short circuits the source of carrier current and this results in the stoppage of the transmission of these currents over the line C in the direction of B. At the B end of the line, suppression of the carrier current produces a current in the plate circuit of tube V'3 which has previously been biased thereby to cut off. This current causes operation of relay $r'8$ which, by its working contacts, connects a low frequency source S', for example, of 16 period per second, to the line $a'$, $b'$ in the direction of the exchange equipment. A call signal is thus actuated in the exchange, the operator branches on to the circuit and establishes the desired connection and the conversation can then take place. At the end of the conversation a ringing current produced by the subscribed is transmitted in the same way and informs the operators that the circuit can be broken.

It will not be necessary to describe the operation of this system when the operator at the exchange wishes to signal a subscriber since it is effected in the same way as when the subscriber rings the exchange, as just described.

As in the case of relay $r1$ in Figure 1, relays $r8$ and $r'8$ of Figure 2 are shunted by condensers C2 and C'2 respectively. These condensers have sufficient capacity to retard the operation and release of these relays and, consequently, make them insensitive to disturbances of short duration.

Figure 3:
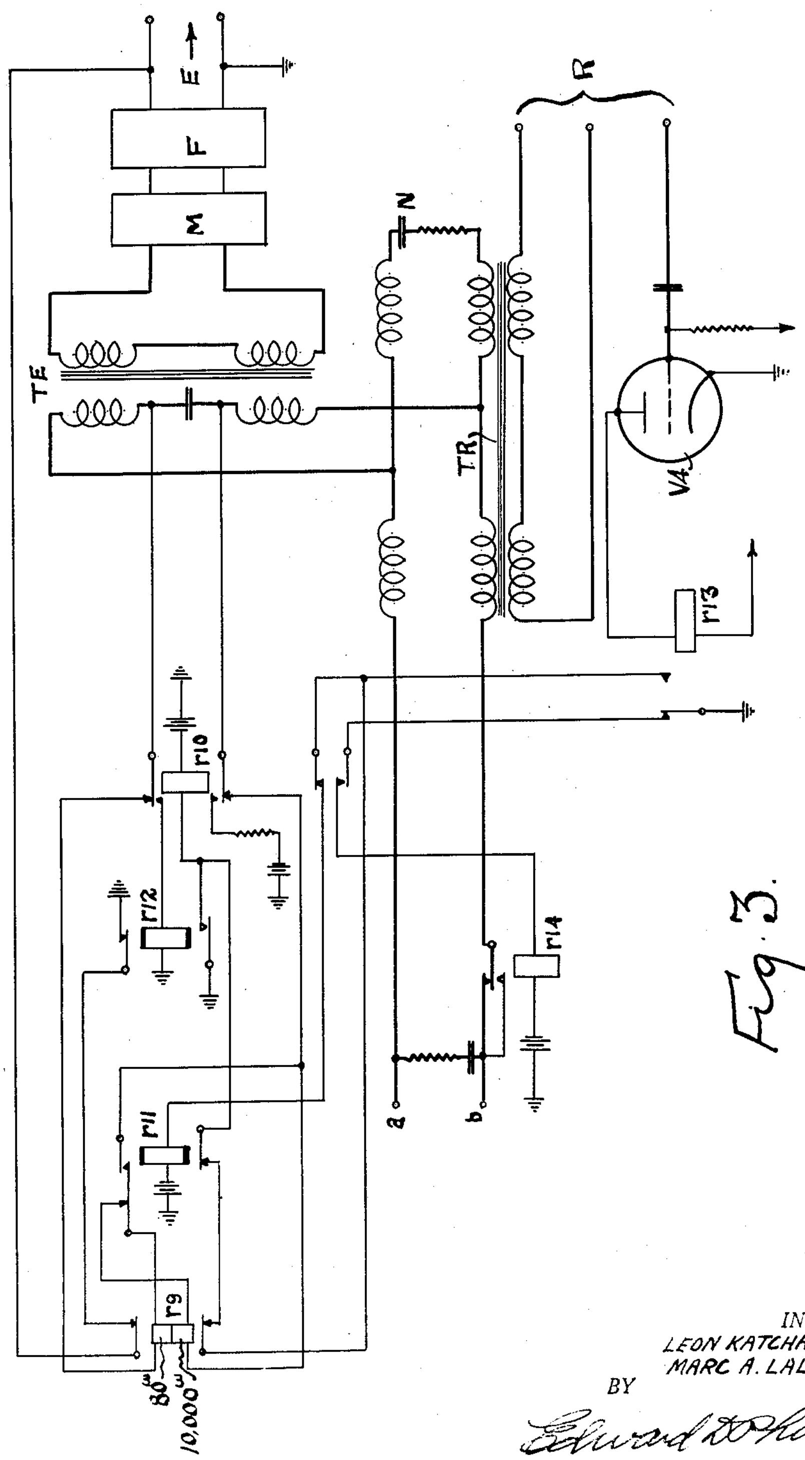
Figures 3 and 4 are schematic illustrations of the application of the subject matter of this invention to a two-way junction line utilizing carrier currents between automatic central exchanges.

Referring now to Figure 3, there is illustrated another application of the invention to provide a signaling circuit applied to a two-way junction line between two central exchanges in a carrier current automatic telephone system. For the sake of simplicity, the apparatus at one exchange only is illustrated in the drawing. The corresponding apparatus at another exchange is exactly the same. It will be simple, therefore, to employ the apparatus of Figure 3 to describe both the transmission and reception of a signal by appropriately assuming that the illustrated apparatus is at one or the other of these exchanges as required. To further simplify this description the calling end shall be designated as before by the reference letter A and the called end by the reference letter B.

In Figure 3, $a$, $b$ indicates the terminals of the two-way junction line, E the terminals of the ringing transmitter circuit and R the terminals of the receiving circuit. TE and TR, respectively, indicate the transformers for coupling the transmitting circuit E and the receiving circuit R to the junction line, a balancing system being shown at N. M represents a carrier current modulator and F a suitable filter circuit.

When one of the exchanges, as for example A, desires to seize a junction line, it places a ground on the wire $a$ and a battery of 48 volts pressure, for example, on the wire $b$. Relay $r9$ is energized from the ground on wire $a$ by half the primary winding of transformer TE, the upper rest contact of $r10$, the lower resistance winding (that is 80 ohms) of $r9$, the upper rest contact of relay $r11$, the high resistance winding (that is, 10,000 ohms) of relay $r9$, the bottom inside rest contact of relay r10, the other half of the primary winding of transformer TE, the rest contact of relay r14 and the battery on wire b.

Upon operation, relay r9 cuts out at its bottom contact the circuit in the direction of relay r10 by means of the bottom rest contact of relay r11 and at its upper contact it opens the short circuit which was applied to the output terminals of the carrier frequency filter F from ground via the upper rest contact of relay r12 and the upper rest contact of relay r9. A carrier current is then transmitted into the junction line C from the transmission equipment M that is connected to the terminals E.

At the called exchange end B (the apparatus illustrated in Figure 3 now being considered to represent the apparatus at B) the carrier current transmitted in this way is received by the equipment connected to the terminals R and after class C amplification by tube V4 it actuates relay r13. Upon operation of this relay, a circuit closes at its working contact which circuit includes the rest contacts of relays r9 and r11 and the winding of relay r10 through a battery to ground. This operates relay r10 to connect the relay r12 between ground and wire a through the upper working contact of relay r10 and the upper half of the primary of transformer TE. The battery (not shown) is connected to the wire b. The circuit of relay r14 is prepared at the bottom working contact of relay r10. When the circuit is completed on the low resistance winding of relay r9 by the operation of an automatic exchange relay (now shown), relay r12 comes into operation giving a direct ground at relay r10 by its lower working contact and lifting the short circuit of the high frequency line by the opening of its upper rest contact. This causes carrier current to be sent from B to A.

At the exchange end A (we now use the circuit of Figure 3 to represent it) relay r13 comes into operation under the influence of the carrier current coming from B and in turn causing operation of r11 from the ground on its working contact via the middle bottom rest contact of relay r10 and the winding of relay r11 to the battery. Relay r11 then opens at its bottom contact the operating circuit of relay r10 which was already cut out by the bottom contact of relay r9 and by its upper working contact puts out of circuit the 10,000 ohm winding of relay r9, but this latter remains energized by its 80 ohm winding. A circuit is formed in the direction of exchange A containing a resistance of 80 ohms instead of 10,000 ohms and in the calling exchange A there operates a relay which provides continuity toward the outcoming selector.

The ringing impulses that then come from the exchange A cause relay r9 at station A to beat in synchronism and in their rhythm interrupt the transmission of the carrier current by short circuiting at the upper contact of relay r9 the wires of the line at the output of filter F. Relay r10 cannot operate because its circuit is kept open by relay r11.

At the called end B, relays r13 and r14 beat in synchronism as does the impulsing relay of the called exchange B and since the release of relay r12 is suitably retarded, it does not fall back and maintains relay r10 by the ground on its bottom working contact. Shortly after the end of the train of signal impulses the short circuit is lifted from a relay at the exchange B and this provides a 10,000 ohm loop at the junction line a, b at exchange B.

At the calling exchange A relay r13 falls back and causes release of relay r11 which falls back slowly. The loop provided in the direction of exchange A is then one of 10,000 ohms and this prepares the next selection at this exchange. When at the B end the circuit provided is again one of 80 ohms everything again begins as described above and a second train of impulses is sent. The 80 and 10,000 ohm circuits are produced alternately in the above described manner until the complete number has been transmitted.

Upon completion of conversation, relay r9 falls back after the release of the junction line has taken place on the calling exchange A in the 10,000 ohm position. At the called end B, relay r13 consequently falls back, relay r14 operates, opens the circuit and causes relay r10 to fall back and then falls back itself. Since the circuit in the direction of exchange B no longer has battery the exchange is released.

If the release of the junction line takes place at the exchange end A in the 80 ohm position, relay r9 falls back. At the exchange end B, relay r13 falls back causing relay r14 to operate and this opens the line and causes relay r12 to fall back and then relays r10 and r14. At the exchange end A, relay r13 falls back and causes relay r11 to fall back. The junction line is then free for a new call.

Figure 4:
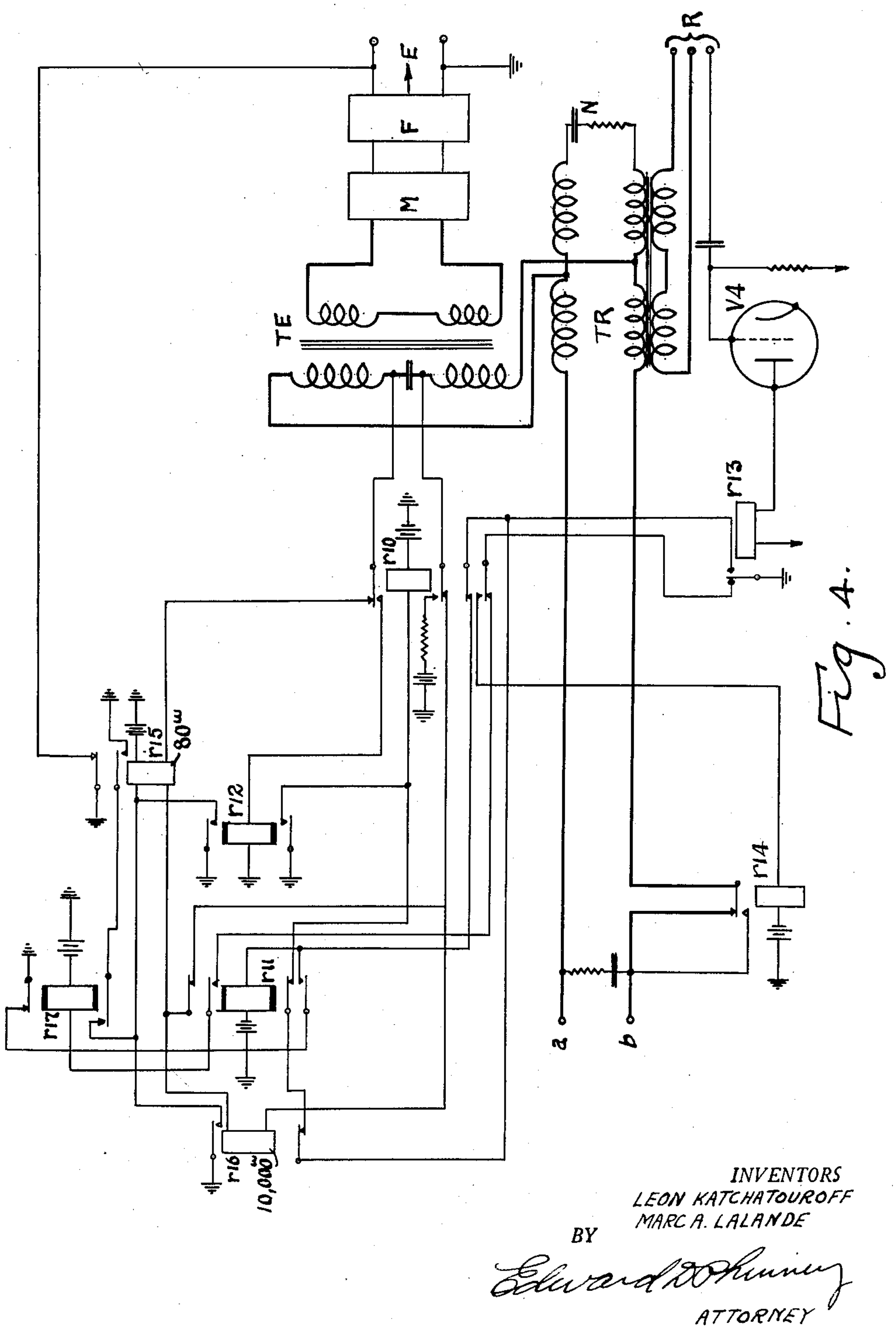

In certain cases, it may not be desirable to provide relays like r9 of Figure 3 that has two windings with such different resistances since such an arrangement cannot indeed be readily obtained with all kinds of relays. Another feature of this invention provides for replacement of this single relay r9 by an assembly of separate relays which play the same role as this relay in the general operation of the system. An example of a circuit so modified is shown in Figure 4.

The operation of the system of Figure 4 will now be explained upon the basis of requirements similar to those set down in connection with the circuit of Figure 3. The corresponding elements of Figures 3 and 4 are designated by the same reference letters.

At the calling end A, a ground is connected to the wire a and a battery to the wire b. Relay r16 becomes energized, cuts the circuit in the direction of r10 and causes operation of r15 which lifts the short circuit from the filter F and thus brings about transmission of carrier current.

At the called end B (the circuit of Figure 4 now being so considered), the carrier wave received by vacuum tube V4 causes operation of relay r13. This relay by its working contact causes operation of relay r10. Relay r12 is connected to the wire a and the battery to the wire b. The circuit of r14 is now prepared. When the 80 ohm circuit is provided for the short circuiting of a suitable relay at exchange A, relay r12 comes into operation giving a direct ground to relay r10 and causing operation of relay r15. This circuit lifts the short circuit of filter F and this sends carrier current from exchange B to exchange A.

At the end A and under the influence of the carrier current coming from B, relay r13 operates and causes operation of relay r11. The latter opens the circuit at r10, becomes blocked at the upper rest contact of relay r17, prepares the operating circuit of relay r17 and short circuits relay r16 which falls back. However, relay r15 continues energized by the 80 ohm winding, the circuit to exchange A is formed by 80 ohms instead of 10,000 ohms and a relay of the calling exchange A comes into operation and gives continuity toward the outcoming selector. The impulses coming from exchange A cause relay r15 to beat in synchronism and in their cadence to interrupt the carrier current by short circuiting the line wires.

At the called end B, relays r13 and r14 beat in synchronism as also does the impulsing relay of the called exchange. Shortly after termination of the train of impulses the equipment of the called exchange provides a circuit of 10,000 ohms. This causes relay r15 to fall back and, consequently, prevents the sending of carrier currents from B to A.

At the calling end, relay r13 falls back and energizes relay r17. The latter maintains relay r15, opens the circuit of r11 which falls back slowly, and lifts the short circuit from relay r16 which becomes energized in its turn and maintains relay r15. Relay r15 falls back slowly since its circuit is opened by the return to rest of relay r11. The circuit formed in the direction of A is then one of 10,000 ohms and this prepares the next selection. When the loop formed at the called end is again 80 ohms everything begins again as described above and the second train of impulses is transmitted. The 80 ohm and 10,000 ohm loops are alternately completed as described and the operation continues until the call is completed.

At the end of the conversation if the release takes place at A in the 10,000 ohm position, relay r15 falls back and causes relay r13 to fall back at the B end. Relay r14 becomes energized, opens the loop and causes relay r10 to fall back then falling back itself.

If the release takes place at the A end and in the 80 ohm position, relay r15 falls back. At the B end relay r13 falls back and this causes operation of relay r14 which opens the line and causes the falling back of relay r12. Then relay r10 itself falls back. Relay r15 then falls back. At the calling exchange end A relay r13 falls back and causes operation of relay r17 which makes relay r11 fall back and then falls back itself.

The circuit illustrated might evidently be adapted to the case of a one-way junction line. In this event, at the A end there would be only relays r16, r15, r17, r11 and r13. At the B end there would be only the relays r13, r14 and r12 but the latter would be provided with a resting contact that short circuits the transmission in the filter F instead of the working contact that controls relay r15.

It is evident, therefore, that the invention herein disclosed is not limited to the specific examples of the embodiments of the drawings but, on the contrary, may have numerous modifications and applications as, for example, in automatic telegraph systems over telephone networks. It also follows that the particular modifications illustrated are capable of numerous detailed variations without departure from the true scope of this invention. We do not, therefore, desire to be strictly limited to this disclosure but rather to the claims granted us.

What is claimed is:

1. A carrier current signal system for an automatic telephone circuit between two exchanges comprising a junction line extending between the exchanges and normally short circuited, means at each exchange for seizing said line and removing the short circuit thereat, means at each end of the line for transmitting a carrier current over the line and made operative at the calling end of the line during conversation periods by the removal of the short circuit thereat, means at the called end of the line controlled by the transmitted carrier current for removing the line short circuit at the called end of the line and for transmitting carrier current back to the calling end, means at the calling end and controlled by the carrier current received thereat for establishing a selector circuit, means at the calling station for controlling the transmission of carrier current in accordance with a ringing signal, means at the called station actuated by said signal for operating an impulsing relay, means at the called exchange at the end of a signal train for controlling the carrier current transmission from the called to the calling station to prepare the selector circuit for the next selection.

2. In the combination of claim 1, said last means including a high resistance circuit and a relay controlled thereby.

3. In an automatic telephone system employing carrier current signalling between a subscriber's station and a central station, the combination comprising a transmission line extending between the two stations, carrier current sources at each station, means controlled at one station for causing the carrier current source thereat to send a carrier current over the line to the other station during conversation periods, means at the second station and responding to said carrier current solely to cause the carrier current source at the second station to send a carrier current over the line to the first station, means at one of said stations for interrupting the carrier current transmitted therefrom for transmitting a calling signal to the other station, and means at the other station controlled by the interrupted carrier current for stopping the transmission of carrier current from the called station during the calling thereof.

4. In an automatic telephone system employing carrier current signaling between a subscriber's station and a central station, the combination comprising a transmission line extending between the two stations, carrier current sources at each station, means controlled at one station for causing the carrier current source thereat to send a carrier current over the line to the other station during conversation periods, means at the second station and responding to said carrier current to cause the carrier current source at the second station to send a carrier current over the line to the first station, means for maintaining said carrier currents on said line throughout the conversation period, and means to restore the transmission line by interrupting the transmission of both carrier currents at the end of the conversation.

LEON KATCHATOUROFF.
MARC A. LALANDE.

REFERENCES CITED

The following references are of record in the file of this patent:

UNITED STATES PATENTS

| Number | Name | Date |
|---|---|---|
| 1,550,658 | Affel | Aug. 25, 1925 |
| 1,773,613 | Clark | Aug. 19, 1930 |
| 2,215,482 | Skillman | Sept. 24, 1940 |
| 2,231,958 | Skillman | Feb. 18, 1941 |
| 2,289,048 | Sandalls | July 7, 1942 |
| 2,294,905 | Honaman | Sept. 8, 1942 |
| 2,330,593 | Kinefake | Sept. 28, 1943 |